United States Patent

[11] 3,586,778

[72] Inventors Alton F. Riethmeier
Rochester;
Frank R. Fahey, Pittsford, both of, N.Y.
[21] Appl. No 786,165
[22] Filed Dec. 23, 1968
[45] Patented June 22, 1971
[73] Assignee Xerox Corporation
Rochester, N.Y.

[54] DATA SET ADAPTER
4 Claims, 2 Drawing Figs.

[52] U.S. Cl. 179/2, 178/22
[51] Int. Cl. H04m 11/06
[50] Field of Search 179/2 R, 2 DP, 3, 4, 22, 1 C, 2 C; 178/22

[56] References Cited
UNITED STATES PATENTS 3,428,749 2/1969 Gray 179/4

*Primary Examiner*—Kathleen H. Claffy
*Assistant Examiner*—Tom D'Amico
*Attorneys*—Paul M. Enlow, Ronald Zibelli, James J. Ralabate, Norman E. Schrader and Franklyn C. Weiss

ABSTRACT: A data set adapter for coupling a facsimile transmission unit to a data set for use in transmitting facsimile information between locations over a direct-distance-dialing common carrier telephone line. By the means of logic and timing circuits, interfacing is accomplished between a facsimile communication unit and a data set coupled to the transmission line terminal. With such a data set adapter the facsimile communication system can be operated in a manual or automatic mode for attended or unattended operation.

INVENTORS.
ALTON F. RIETHMEIER
FRANK R. FAHEY
BY Franklyn C. Weiss
ATTORNEY

PATENTED JUN 22 1971

3,586,778

SHEET 2 OF 2

DATA SET ADAPTER

BACKGROUND OF THE INVENTION

In prior art facsimile systems, documents to be transmitted are scanned at a transmitting station to convert information on the document into a series of electrical signals. These video signals are then coupled to the input of a communication link interconnecting a transmitter with a receiver. At a receiving location, video signals selectively control the actuation of appropriate marking means to generate a facsimile of the document transmitted.

Due to the prohibitively high cost of installing and maintaining communication links which couple the communication units, the common carrier direct-distance-dialing telephone system is becoming increasingly attractive for use in data transmission. Because of the worldwide telephone system, the use thereof for such data transmission is the only economical means of establishing an extensive, while reliable, communication network. Tariff restrictions, however, prevent the direct electrical connection between the telephone line provided by a common carrier and a data transmission system sold or leased to the general public. One technique of avoiding direct electrical connection to the telephone system is by the use of acoustic or inductive coupling between the data transmission unit and the telephone handset of the telephone unit provided by the common carrier. The use of acoustic coupling, however, presents a serious drawback to efficient data transmission due to the fact that normally the telephone handset must be physically moved from the telephone cradle to an acoustic coupler by an operator to couple the data transmission unit to the telephone line. Thus, automatic, unattended operation of the data transmission unit becomes impossible due to the fact that automatic answering and disconnecting equipment cannot be coupled to the line except upon provision of such equipment by the common carrier.

It becomes necessary, therefore, to provide the proper interfacing circuitry between a data transmission system such as a facsimile transmission system and the data set equipment provided by the common carrier.

OBJECTS OF THE INVENTION

It, is accordingly, an object of the present invention to optimize the operation of a data communication system.

It is another object of the present invention to provide an interface between a data communication system and the automatic electrical equipment provided by a common carrier telephone company.

It is another object of the present invention to provide manual and automatic modes for attended and unattended operation of a data communication system.

It is another object of the present invention to provide automatic and manual control for attended and unattended operation of a facsimile communication unit electrically coupled to a direct-distance-dialing telephone system.

BRIEF SUMMARY OF THE INVENTION

In accomplishing the above and other desired aspects of the present invention, applicants have invented novel apparatus for interfacing between a facsimile transmission system and a data set on the terminal of a communication link, the signals necessary for the manual and automatic provision of attended and unattended operation of the facsimile unit. By various inputs denoting certain conditions noted below, logic circuitry in conjunction with a timing circuit initiates the proper conditioning signals for the sequential operation of the facsimile communication unit and the data set coupled to the communication link. A manual switch is provided which places the adapter in a mode that requires the manual intervention by an operator. An automatic switch is provided which establishes the proper signal levels to allow the data set to automatically detect and answer an incoming telephone call. Upon receipt at the adapter of the signal denoting that transmission has commenced, automatic receipt by the facsimile unit in the receive mode of a document follows. When the facsimile unit is in the transmit mode, the automatic transmission of a document can occur upon control of an operator at a remote location. The timing circuit within the adapter allows a predetermined time delay to occur which provides the data set with a signal that effectively hangs up the data set upon detection by the adapter of a loss of paper, loss of carrier detect, or the fact that the data set itself was not placed in the proper operating mode.

DESCRIPTION OF THE DRAWINGS

For a more complete understanding of the invention, as well as other objects and further features thereof, reference may be had to the following detailed description in conjunction with the drawings wherein.

DETAILED DESCRIPTION OF THE INVENTION

Figure 1:
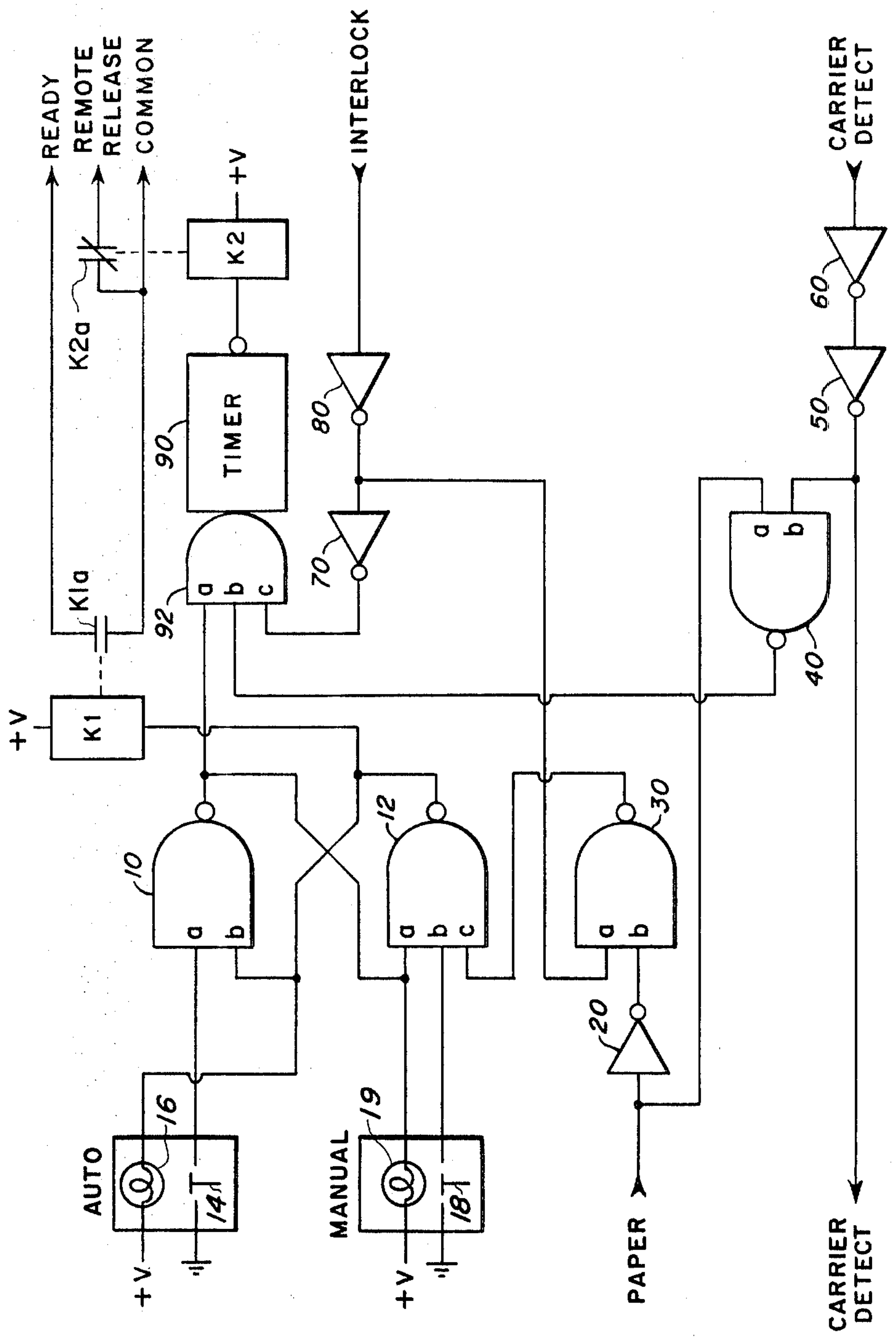
FIG. 1 is a block diagram of the electrical and logic circuitry included in the data set adapter employing the principles of the present invention.

FIG. 1 of the present application discloses a block diagram of the logic circuitry, which in conjunction with the timing circuit and the mode switches, allows for automatic or manual operation in attended or unattended modes of operation. The input signals to the block diagram in FIG. 1 include the paper input signal which denotes the presence or absence of copy paper or an original document to be transmitted or received in the facsimile unit to which the data set adapter is coupled. The carrier detect input and output shown in FIG. 1 are the signals received from the data set indicating that transmission of information has commenced, which indication is also transferred to the facsimile unit for the proper indication thereto for the allowance of receipt and reproduction of the incoming facsimile data. The interlock signal input is received from the data set and indicates to the data set adapter which mode of operation the data set itself has been placed. The ready and common signal outputs are coupled to the data set to indicate thereto the status of operation of the data set adapter. The remote release output is coupled to the data set to indicate thereto that the data set adapter has gone through a timing sequence and thus releases the data set from automatic operation henceforth.

The facsimile communication unit for which the data set adapter may be effectively utilized includes the facsimile transceiver sold under the registered trademark Telecopier, which is manufactured and marketed by the Xerox Corporation in Rochester, New York. This facsimile unit, being a transceiver, allows for separate transmission or receipt of a document depending upon the mode in which the unit is placed. In the transmit mode a document can be effectively transmitted over a transmission link to a remote transceiver in the receive mode in a predetermined amount of time. With the local transceiver in the receive mode, a remote facsimile transceiver is able to transmit the contents of an original document to the local facsimile unit which will faithfully reproduce a facsimile of said original document.

The data set as herein described may be, for example, the Western Electric Model 602 Data Set which is readily available from the common carrier for electrical connection to the telephone line. A data set, such as the model 602, can be used to transmit or receive information over the direct-distance-dialing network and has three modes of operation which can be selected by the operator. In the talk mode an operator would depress the talk button when it is desired to use the data set like a normal telephone. Connected to the data set itself is a normal telephone handset and the normal dial or pushbuttons for dialing over the direct distance dialing common carrier telephone network. When, however, the data button is depressed, the handset is bypassed, and an electrical connection rather than an acoustic connection is made to the telephone line. For purposes of definition in the subject application, facsimile transmission is possible only with the data set being placed in the data mode. It is apparent, however, that an acoustic coupling type of transmission can be made when a separate acoustic coupler is used. In this instance the data set is utilized as a standard telephone when in the talk mode. A third mode is the test mode which is provided to allow remote testing of the data set from a central telephone office, which is of no concern in the present application.

In the Automatic Receive Mode the facsimile equipment, including the facsimile unit itself, the data set and the data set adapter can be preset for automatic operation when the data set detects an incoming telephone call. To preset the apparatus to the automatic receive mode, an operator would load the facsimile unit with copy paper, which places a logic one in binary language on the paper input line to inverter 20. The operator would then select the automatic mode by enabling the automatic switch 14 which by internal operation activates the light 16. The energizing of the switch 14 coupled input 10*a* of NAND gate 10 to ground or logic zero. By definition, any time the input to a NAND gate is logic zero the output appears as a logic one. Thus, a logic one appears at the input 12*a* of NAND gate 12. Input 12*b* to NAND gate 12 is at logic one due to the fact that switch 18 is open. Input 12*c* to NAND gate 12 is now at a logic one due to the fact that the presence of paper at the facsimile unit places a logic one on the input to inverter 20, thereby inverting the signal to place a logic zero on input 30*b* of NAND gate 30. The output of NAND gate 30 is thus at a logic one, which is coupled to the input 12*c* of NAND gate 12. With all the inputs to NAND gate 12 appearing as a logic one, the output thereof goes to a logic zero or ground condition, thus completing the circuit of the positive voltage supply +V through relay coil K1. Contacts K1*a* of relay K1 close, thereby sending a ready signal to the data set.

The data set monitors the ready signal and it and the facsimile unit are now ready to receive a facsimile transmission. When an operator at a remote facsimile unit desires to send a document to the local facsimile unit, the telephone number of the local data set is dialed by the direct-distance-dialing network, the data set automatically answering the call. Upon establishment of communication with the remote operator, the local data set automatically switches to the data mode which applies a logic one level on the interlock line to the input of inverter 80. By inversion in inverters 80 and 70, a logic one appears on the interlock line and the input 92*c* of NAND gate 92. Since the remote facsimile unit has not yet begun to transmit, a logic zero level remains on the carrier detect line to the input to inverter 60. By inverters 60 and 50, a logic zero level is transmitted to the facsimile unit and also to input 40*b* of NAND gate 40. As previously set forth, any time a logic zero appears on the input to a NAND gate the output thereof remains at logic one. Thus, input 92*a* of NAND gate 92 is at a logic one level indicating that the facsimile unit and data set adapter are in the automatic mode; and input 92*b* of NAND gate 92 is at a logic one denoting the absence of carrier detect at the input of inverter 60. Input 92*c* is at a logic one level due to the fact that the data set has indicated to the inverter 80 that the data set is in the data mode and ready to receive information. With all the inputs to NAND gate 92 at the logic one level the output therefrom is at a logic zero which, by definition, initiates the operation of timer 90. If, for instance, no carrier detect is received by the data set, indicating that no data transmission is received from the remote facsimile unit, after a predetermined time interval, say 30 seconds, timer 90 times out and energizes relay K2. When relay K2 is energized contacts K2*a* of the relay are opened, opening the circuit to the data set, which will now automatically hang up the unit. Another call must now be made to the data set in order to reestablish transmission.

Another event will send a hang up signal to the data set. If the paper supply in the facsimile unit is or becomes depleted, the input to inverter 20 goes to logic zero as does the input 40*a* of NAND gate 40. The output of NAND gate 40 is thus at a logic one which places the input 92*b* at a logic one also. With all the inputs to NAND gate 92 at a logic one, the timer operates and after a 30 second time interval the relay K2 opens contacts K2*a* and the data set will hang up indicating to a remote operator that the local unit is unable to complete the transmission or receipt of a document. With this loss of paper signal, the inverter 20 inverts the logic zero level to a logic one level and applies it to input 30*b* of NAND gate 30. The signal output from NAND gate 30 resets the latch circuit comprising NAND gates 10 and 12, thereby opening relay contacts K1*a*. This indicates to the data set that the data set adapter and the facsimile unit are not ready to receive or transmit a document and thus the data set will not answer a subsequent incoming call.

When, however, during the 30 second time interval of timer 90, carrier detect is received at the data set indicating that the remote facsimile unit is transmitting information, the logic level on the carrier detect line goes from logic zero to logic one. Through inverters 50 and 60 the logic one level is applied to input 40*b* of NAND gate 40. With the input to 40*a* at a logic one level indicating a sufficient paper supply and the input 40*b* at a logic one denoting carrier detect received, the output of the NAND gate 40 will go to logic zero. With the input 92*b* of NAND gate 92 now at a logic zero the timer is reset, thereby preventing relay K2 from operating and the data set remains connected to receive the input facsimile data information. By a separate line from the data set to the facsimile unit, not shown, the facsimile information is received and passed to the facsimile unit for printing out the document.

Turning now to the Automatic Send Mode, the remote operator can dial the number of the data set and initiate the automatic transmission of a document from the present location to the remote location where the operator is located. Thus, an operator at the present location can load the facsimile unit with a document to be transmitted, depress the automatic switch on the data set adapter, set the facsimile transmitter for transmission and anytime thereafter, such as during the evening when telephone rates are cheaper, an operator at the remote location can call the local facsimile unit and initiate the transmission of the document from the local location to the remote location. In a manner similar to that set forth above for the automatic receive mode, the operation of auto switch 14 activates light 16, closes relay contacts K1*a* and indicates to the data set that the data set adapter is ready to receive a telephone call.

When the data set detects the receipt of a call, the indication thereof is presented on the interlock line. Upon receipt of the interlock signal both at the adapter and the facsimile unit, by a line not shown, the local facsimile transmitter begins transmitting the document which had been preloaded into the machine by the operator at the local location. Transmission will last as long as a length of document remains in the machine for transmission. When the original document has been scanned and transmitted, the logic level on the input to inverter 20 goes from logic one to logic zero upon the end of scanning of the document. This condition, similar to the loss of paper in the situation previously described, activates timer 90 which, after the predetermined time interval, say 30 seconds, activates relay K2 to open contacts K2*a* to indicate to the data set to hang up the incoming call. Further, the latch circuit 10 and 12 is reset, thereby returning the data set adapter from the automatic to the manual mode to prevent another call to the data set from being answered.

In the Manual Receive Mode where an operator wishes to monitor the entire operation of receiving a document from a remote facsimile transmitter, many of the internal operations of the adapter are bypassed and are unnecessary for manual operation. For instance, a possible sequence would be as follows. The manual switch 18 would be operated, thereby automatically lighting the light 19 indicating that the data set adapter is in the manual mode. Since the adapter is in the manual mode, a logic zero would appear at input 12*b* to NAND gate 12 thereby presenting a logic one on the output of the NAND gate to disable relay K1. With relay K1 disabled, the ready signal is not sent to the data set, thereby indicating that when a call is made to the present location, the data set must be answered as a normal telephone. That is, the data set will not answer or switch to the data mode automatically. Thus, with the manual button depressed, and a call is detected by the ringing of the data set, the operator must answer by lifting the handset on the data set and press the talk button on the data set to converse with the caller. When the caller indicates to the receive operator that a document is to be transmitted, the operator at the present location manually presses the data button on the data set and replaces the telephone handset back on the data set cradle. In this way, the transmitted information can be transmitted through the data set directly to the receiving facsimile unit.

When transmission is completed, as by detection of the cessation of operation of the receiving facsimile unit, the operator at the present location again depresses the talk button on the data set and converses with the caller as to quality of output document, etc., and then terminates the call by placing the phone handset back in the cradle of the data set. As the data set adapter continues in the manual mode, relay K1 remains deenergized and, thus, a subsequent phone call must be manually answered as in the normal way. The carrier detect circuit in the receive mode still operates in that the facsimile unit does not function until the unit receives the carrier detect signal indicating that information has actually been received at the receive data set.

The Manual Send Mode operates in exactly the same manner as in the manual receive mode with the exception that the local operator initiates the telephone conversation. That is, the operator would press the talk button on the data set, lift the phone handset from the cradle and dial the remote facsimile location, establish contact with the location, depress the data button on the data set, replace the phone handset back in the cradle of the data set, and initiate transmission of the original document at this location by starting the operation of the facsimile transmitter.

Figure 2:
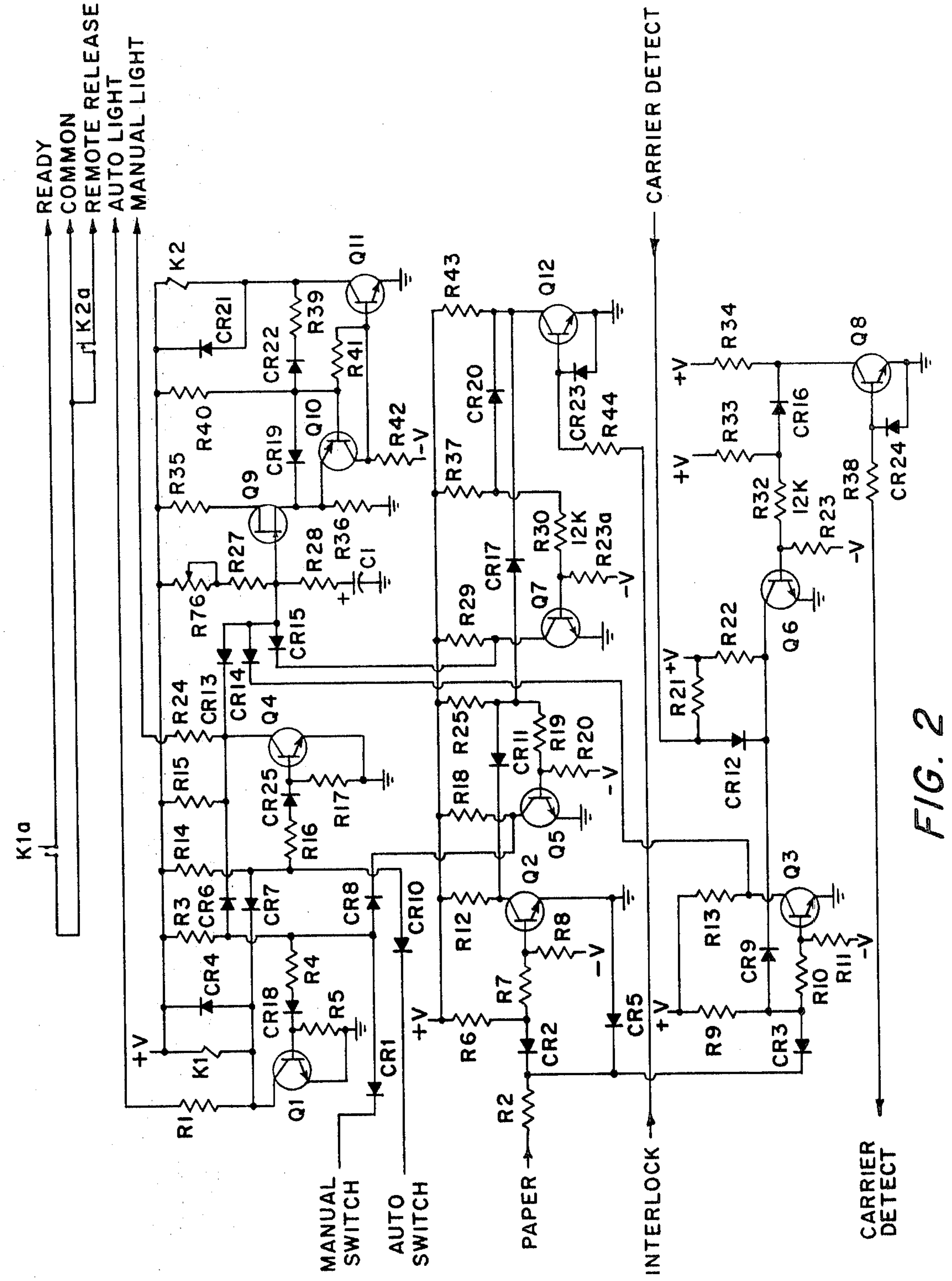
FIG. 2 is a schematic diagram of the logic and electrical circuitry seen in FIG. 1.

Referring now to FIG. 2, there is shown therein the schematic diagram of the circuitry set forth in FIG. 1. For ease of illustration it can be seen that similar components or inputs are labeled similarly with those shown in FIG. 1. As seen in FIG. 1, the auto switch 14 is coupled to input 10*a* of NAND gate 10, while the light 16 is coupled to the input 10*b* of NAND gate 10 in addition to the output of NAND gate 12. In FIG. 2 the auto switch line is coupled to the diode CR10 as indicating the input 10*a* of NAND gate 10. As seen in FIG. 2, transistor Q1 and transistor Q4 correspond to NAND gates 10 and 12, respectively. Associated with transistor Q1 are resistors R1, R3, R4, and R5; diodes CR4, CR7, and CR18 and additionally relay coil K1 coupled to a positive voltage supply +V. Associated with transistor Q4 are resistors R14, R15, R16, and R17; and diodes CR6, and CR25.

Input 12*a* of NAND gate 12 can be seen to be coupled to the resistor R24 which is coupled to the manual light indication. Input 12*b* of NAND gate 12 is seen to be coupled to diode CR1 and is connected to the manual switch 18 as seen in FIG. 1. Input 12*c* of NAND gate 12 is from the output of NAND gate 12 is from the output of NAND gate 30 and is coupled to diode CR8 in FIG. 2. Input 10*a* of NAND gate 10 is coupled to diode CR10 while input 10*b* of NAND gate 10 is coupled to resistor R1 which is coupled to the autolight indication in FIG. 2. When the auto switch 14 is thrown, transistor Q1 allows current to flow externally in FIG. 2 through the autolight, through input 10*b* coupled to resistor R1 and through transistor Q1 now conducting to ground. If the manual switch is thrown, transistor Q4 is enabled allowing current to flow through the manual light and into input 12*a* of NAND gate 12 through resistor R24 to ground through the transistor Q4. Relay coil K1 is coupled to the output of NAND gate 12 and when it is enabled the contacts K1*a* close indicating to the data set through the ready and common lines that the adapter is ready to transmit or receive information.

The paper indication signal input appears on input 20*a* to inverter 20. The inverter comprises transistor Q2 and associated resistors R2, R6, R7, and R8, together with diodes CR2 and CR5. Resistor R6 is coupled to a positive power supply +V while resistor R8 is coupled to negative voltage supply −V. The inverter transforms the logic levels into the opposite logic levels for application into input 30*b* of NAND gate 30. Input 30*b* in FIG. 2 is coupled to diode CR11 and is one input to the NAND gate. The other input 30*a* is coupled to diode CR17 in FIG. 2. NAND gate 30 comprises transistor Q5 and associated resistors R18, R19, R20, R25, and diodes CR11 and CR17.

The inputs to NAND gate 92 include input 92*a* coupled to diode CR13, input 92*b* coupled to diode CR14, and input 92*c* coupled to diode CR15. The output of the gate is applied to a field effect transistor Q9, for operation of the timing circuit. The time constant of the circuit is determined by adjustable resistor R76, resistors R27 and R28 which determine the amount of current passing to capacitor C1. When the capacitor C1 is charging to its predetermined voltage, as determined by the RC time constant thereof, the field effect transistor Q9, through resistors R35 and R36 coupled thereto, generates the necessary voltage for the operation of timing transistors Q10 and Q11. When the inputs to the timing circuit are such that the timer is not operating, the output of field effect transistor Q9 is effectively at ground potential. At this time transistor Q10 and Q11 are both turned off, thereby allowing the supply voltage +V to appear at the collector of transistor Q11 through the relay coil K2. When capacitor C1 is charged up to its predetermined voltage, upon the necessary inputs to NAND gate 92, the field effect transistor passes current through resistor R35, transistor Q10, and resistor R42 to the negative voltage supply −V. At this point, therefore, a positive voltage appears at the output of field effect transistor Q9 at the junction of the emitter of transistor Q10 and the cathode of CR19. This applies a positive voltage to the input emitter of transistor Q10, allowing current to pass through resistor R40, diode CR19, through the transistor Q10 and resistor R42 back to the negative voltage supply −V. The positive voltage now appearing at the base of transistor Q11 forward biases this transistor, turning it on, to effectively place the collector thereof at ground potential. With transistor Q11 now in the on condition, current passes through relay coil K2 which opens relay contacts K2*a*, thereby giving a hang up signal to the data set.

The interlock signal which is necessary for the operation of timer 90, is coupled to resistor 44 in FIG. 2. The interlock signal, as hereinabove set forth indicates that the data set has been placed in the data mode by the operator. The data mode signal initiates the operation of the timer until the receipt of the carrier detect signal at inverter 60 which disables or resets the timer 90. The inverter 80 comprises transistor Q12, resistor R44 and diode CR23. The output of inverter 70 appears at the collector of transistor Q12 and is coupled to inverter 70 which comprises transistor Q7 and associated resistors R23*a*, R29, R30, R37, and diode CR20. As seen in FIG. 1, the output of inverter 80 is coupled to input 30*a* of NAND gate 30. Input 30*a* is the cathode terminal of diode CR17 and is coupled to the collector of transistor Q12. The output of inverter 70 is connected to terminal 92*a* of NAND gate 92. This output is coupled to the collector of transistor Q7 between the transistor Q7 and resistor R29, seen in FIG. 2.

The carrier detect signal is applied to inverter 60 which comprises transistor Q6 and associated resistors R21, R22, R23, R32, R33, and R34 with diode CR12 and CR16. The output of inverter 60 is coupled to inverter 50 which comprises transistor Q8, resistor 38 and diode CR24 which couples the adapter through the carrier detect line to the facsimile unit.

NAND gate 40 with inputs 40*a* and 40*b* comprises transistor Q3 and resistors R9, R10, R11, and R13 with diodes CR3 and CR9. Input 40*a* is coupled to resistor R2 which is the paper signal input while the input 40*b* is coupled to the inverters to receive the carrier detect indication for the disabling of the timing circuit through input terminal 92*b*.

Seen throughout the circuitry in FIG. 2 are positive voltage supplies and negative voltage supplies +V and −V. The positive and negative voltage supplies are necessary due to the fact that defined for the facsimile unit is the positive voltage indicating a logic one while the ground condition indicates a logic zero. Due to the convention defined by the electronics industry, a positive voltage indicates logic one while a negative voltage indicates a logic zero. Thus, the positive and negative voltage values are necessary to transform the positive voltage and ground condition indicating logic and logic zero, respectively, to a positive voltage and negative voltage indicating logic one and logic zero, respectively, as defined by the electronics industry.

In the foregoing there has been disclosed apparatus for the conversion of signals generated by a facsimile unit to those signal levers necessary for electrical connection to the common carrier telephone line. In addition, automatic and manual control has been set forth for both attended and unattended operation of a facsimile unit whether controlled locally or by remote signalling. While the invention has been described with reference to specific components and logic circuitry, it will be understood by those skilled in the art that various changes may be made and equivalents may be substituted for elements thereof without departing from the true spirit and scope of the invention. In addition, many modifications may be made to adapt a particular situation to the teachings of the invention without essentially departing therefrom.

We claim:

1. Apparatus for coupling a facsimile communication unit to a data set connected to the terminal of a communication link comprising:

means for placing said apparatus in one of two operating modes, gating means coupled to said placing means and responsive to the indicated mode of operation and to associated system status indication signals, first means coupled to said gating means for indicating to said data set the operational mode of said apparatus, timing means responsive to said status indication signals and coupled to said gating means for commencing a time sequence upon certain predetermined status indication signals being received at said timing means, second means coupled to said timing means for indicating to said data set to remain connected or to disconnect, respectively, said apparatus from said communication link in accordance with said time sequence, wherein said placing means comprises switch and associated indicator means for placing said apparatus in an automatic mode for automatic operation of said facsimile communication unit, said first indicating means being responsive to said automatic mode of operation established in said gating means for indicating to said data set said automatic mode of operation, first means for detecting a status indication signal from said data set upon automatic establishment of a communication over said communication link to enable said timing means, second means for detecting the receipt of facsimile data over said communication link in the receive mode and disabling the time sequence of said timing means prior to the end of said time sequence, said timing means completing said time sequence in the absence of the receipt of facsimile data over said communication link, thereby enabling said second indicating means to indicate to said data set to disconnect said communication established over said communication link, third means for detecting a status indication signal from said facsimile communication unit indicating an absence of recording media at said facsimile communication unit, said gating means coupled to said third detecting means and including fourth means for detecting the immediate loss of said recording media to enable said timing means to commence its time sequence, thereby allowing said second indicating means to disconnect said data set from said communication established over said communication link, and fifth means for detecting the long time absence of recording media to enable said first indicating means to indicate said absence of recording media to said data set to prevent further establishment of communications over said communication link.

2. Apparatus for coupling a facsimile communication unit to a data set connected to the terminal of a communication link comprising:

means for placing said apparatus in one of two operating modes, gating means coupled to said placing means and responsive to the indicated mode of operation and to associated system status indication signals, first means coupled to said gating means for indicating to said data set the operational mode of said apparatus, timing means responsive to said status indication signals and coupled to said gating means for commencing a time sequence upon certain predetermined status indication signals being received at said timing means, second means coupled to said timing means for indicating to said data set to remain connected or to disconnect, respectively, said apparatus from said communication link in accordance with said time sequence, wherein said placing means comprises switch and associated indicator means for placing said apparatus in an automatic mode for automatic operation of said facsimile communication unit, said first indicating means being responsive to said automatic mode of operation established in said gating means for indicating to said data set said automatic mode of operation, first means for detecting a status indication signal from said data set upon automatic establishment of a communication over said communication link to enable said timing means, second means for detecting the forward transmission of facsimile data over said communication link in the transmit mode and disabling the time sequence of said timing means prior to the end of said time sequence, said timing means completing said time sequence in the absence of the forward transmission of facsimile data over said communication link, thereby enabling said second indicating means to indicate to said data set to disconnect said communication established over said communication link, third means for detecting a status indication signal from said facsimile communication unit indicating an absence of original documents or the like at said facsimile communication unit, said gating means coupled to said third means and including fourth means for detecting the immediate loss of said document or the like to enable said timing means to commence its time sequence thereby allowing said second indicating means to disconnect said data set from said communication established over said communication link, and fifth means for detecting the long time absence of said documents or the like to enable said first means to indicate said absence of documents or the like to said data set to prevent further establishment of communication over said communication link.

3. Apparatus for coupling a facsimile communication unit to a data set connected to the terminal of a communication link comprising:

means for placing said apparatus in one of two operating modes,

NAND gate means coupled to said placing means and responsive to the indicated mode of operation and to associated system status indication signals, first means coupled to said NAND gate means for indicating to said data set the operational mode of said apparatus, timing means responsive to said status indication signals and coupled to said NAND means for commencing a time sequence upon certain predetermined status indication signals being received at said timing means, second means coupled to said timing means for indicating to said data set to remain connected or to disconnect, respectively, said apparatus from said communication link in accordance with said time sequence, wherein said placing means comprises switch and associated indicator means for placing said apparatus in a manual mode for manual operation of said communication unit, said first indicating means responsive to said manual mode of operation established in said NAND gate means and indicating to said data set said manual mode of operation, means for manually switching said data set to the manual mode, first means for detecting a status indication signal from said data set upon manual establishment of a communication over said communication link to enable said timing means, and second means for detecting the receipt of facsimile data over said communication link in the receive mode and disabling the time sequence of said timing means prior to the end of said time sequence, said timing means completing said time sequence in the absence of the receipt of facsimile data over said communication link, thereby enabling said second indicating means to indicate to said data set to disconnect said communication established over said communication link.

4. Apparatus for coupling a facsimile communication unit to a data set connected to the terminal of a communication link comprising:

means for placing said apparatus in one of two operating modes,

NAND gate means coupled to said placing means and responsive to the indicated mode of operation and to associated system status indication signals, first means coupled to said NAND gate means for indicating to said data set the operational mode of said apparatus, timing means responsive to said status indication signals and coupled to said NAND gate means for commencing a time sequence upon certain predetermined status indication signals being received at said timing means, second means coupled to said timing means for indicating to said data set to remain connected or to disconnect, respectively, said apparatus from said communication link in accordance with said time sequence, wherein said placing means comprises switch and associated indicator means for placing said apparatus in a manual mode for manual operation of said communication unit, said first indicating means responsive to said manual mode of operation established in said NAND gate means and indicating to said data set said manual mode of operation, means for manually switching said data set to the manual mode, first means for detecting a status indication signal from said data set upon manual establishment of a communication over said communication link to enable said timing means, and second means for detecting the forward transmission of facsimile data over said communication link in the transmit mode and disabling the time sequence of said timing means prior to the end of said time sequence, said timing means completing said time sequence in the absence of the forward transmission of facsimile data over said communication link, thereby enabling said second indicator means to indicate to said data set to disconnect said communication established over said communication link.